(12) United States Patent
McGloin et al.

(10) Patent No.: US 9,275,234 B2
(45) Date of Patent: *Mar. 1, 2016

(54) PROTECTING DATA ON A MOBILE DEVICE (71) Applicant: International Business Machines Corporation, Armonk, NY (US)

(72) Inventors: Mark Alexander McGloin, Dublin (IE); Olgierd Pieczul, Dublin (IE); Joseph Celi, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 26 days.

This patent is subject to a terminal disclaimer.

(21) Appl. No.: 13/782,284

(22) Filed: Mar. 1, 2013

(65) Prior Publication Data

US 2014/0032921 A1 Jan. 30, 2014

Related U.S. Application Data

(63) Continuation of application No. 13/558,445, filed on Jul. 26, 2012.

(51) Int. Cl.
*G06F 21/60* (2013.01)
*G06F 21/55* (2013.01)
*G06F 21/88* (2013.01)

(52) U.S. Cl.
CPC .............. *G06F 21/60* (2013.01); *G06F 21/554* (2013.01); *G06F 21/88* (2013.01)

(58) Field of Classification Search
None
See application file for complete search history.

(56) References Cited

U.S. PATENT DOCUMENTS

| 7,149,738 | B2 * | 12/2006 | Kumar et al. | 707/694 |
|---|---|---|---|---|
| 2003/0097596 | A1 * | 5/2003 | Muratov et al. | 713/202 |
| 2004/0054896 | A1 * | 3/2004 | Himmel et al. | 713/167 |
| 2006/0053290 | A1 * | 3/2006 | Randle et al. | 713/169 |
| 2006/0122975 | A1 * | 6/2006 | Taylor et al. | 707/3 |
| 2008/0109679 | A1 * | 5/2008 | Wright et al. | 714/37 |
| 2009/0070878 | A1 * | 3/2009 | Wang et al. | 726/24 |
| 2009/0323972 | A1 | 12/2009 | Kohno et al. | |
| 2010/0031366 | A1 * | 2/2010 | Knight et al. | 726/26 |
| 2010/0162373 | A1 | 6/2010 | Springfield et al. | |
| 2010/0216429 | A1 | 8/2010 | Mahajan | |
| 2010/0250497 | A1 * | 9/2010 | Redlich et al. | 707/661 |
| 2011/0161848 | A1 * | 6/2011 | Purcell et al. | 715/764 |
| 2011/0271344 | A1 * | 11/2011 | Unagami et al. | 726/23 |
| 2012/0036344 | A1 * | 2/2012 | Hubner et al. | 713/1 |
| 2012/0102571 | A1 * | 4/2012 | Sheldon | 726/26 |
| 2012/0124640 | A1 * | 5/2012 | Bender et al. | 726/1 |
| 2012/0185910 | A1 * | 7/2012 | Miettinen et al. | 726/1 |

(Continued)

FOREIGN PATENT DOCUMENTS

WO WO2009122309 10/2009

*Primary Examiner* — Andrew Nalven
*Assistant Examiner* — Abdulhakim Nobahar
(74) *Attorney, Agent, or Firm* — David B. Woycechowsky; David H. Judson (57) ABSTRACT

A password protection application is executed on a mobile device and provides an interface by which an authorized user can define and configure a "data protection profile" for the device. This profile defines at least one security event (criteria or condition) associated with the device, and at least one protection action that should occur to protect data on the device upon the triggering of the event. Once defined in a profile, the application monitors for the occurrence of the security event. Upon the occurrence of the specified event, the protection action is enforced on the device to protect the data.

9 Claims, 4 Drawing Sheets

(56) References Cited

U.S. PATENT DOCUMENTS

| | | |
|---|---|---|
| 2012/0237908 A1* | 9/2012 | Fitzgerald et al. ............ 434/236 |
| 2013/0014280 A1* | 1/2013 | Robbins et al. ................. 726/28 |
| 2013/0031598 A1* | 1/2013 | Whelan et al. ................... 726/1 |
| 2013/0254831 A1* | 9/2013 | Roach et al. ...................... 726/1 |

* cited by examiner

PROTECTING DATA ON A MOBILE DEVICE

BACKGROUND OF THE INVENTION

1. Technical Field

This disclosure relates generally to mobile device security and, in particular, to resetting passwords on a device that has been stolen or otherwise compromised.

2. Background of the Related Art

Mobile devices, such as a smartphone or tablet, are in widespread use among consumers. The use of state-of-the-art processors, memory, multi-touch display screens, and the like in these devices enable support of a large number of mobile applications. These devices also support web browsing software.

Users of mobile devices typically save user names and passwords on their devices to avoid having to retype the password each time they enter a user account. This is due to the form factor of the device. On bringing up any of the corresponding applications or web pages, e.g., a credit card account, the user name and password are typically auto-filled from memory. When a mobile device is stolen and unlocked, however, a thief can recover from the device those user name/password combinations, thereby exposing the user's personal information. This may happen quickly, where an unlocked phone is taken from the owner; moreover, even if the device includes an automatic screen locking function, a more sophisticated thief may have the ability to unlock the phone and still recover the user's sensitive data. Moreover, where users have many user name/passwords on their device, it may prove difficult to act on all the related accounts quickly, e.g. reset the password(s) or disable the account. This creates significant security vulnerabilities.

It is known in the prior art to implement a master password on a device to encrypt all other passwords. Thus, a thief cannot access any of the passwords on the device unless the phone is unlocked with the master password. While this approach does provide for security, it defeats the purpose of using auto-fill on the device, and thus many users do not like to use it. In addition, where a device is unlocked and stolen, a thief may use cracking software to decrypt to master password, thereby exposing all sensitive data.

Another approach is to disable the phone or delete all of its data upon theft. In particular, some organizations require their users to install software on the device that will delete all data upon receipt at the device of a message. The problem with this approach is that there are times when the user is unsure if the device is stolen or, rather, simply misplaced (to be later found).

There remains a need to provide enhanced security techniques for password and other data protection on mobile devices.

BRIEF SUMMARY

This disclosure describes a method of protecting a mobile device. According to this approach, a password protection application is executed on the device and provides an interface by which an authorized user can define and configure a "data protection profile" for the device. This profile defines at least one security event (criteria or condition) associated with the device, and at least one protection action that should occur to protect data on the device upon the triggering of the event. Once defined in a profile, the application monitors for the occurrence of the security event. Upon the occurrence of the specified event, the protection action is enforced on the device to protect the data.

The data protected typically is "private data," such as one or more passwords that are resident on the device. More generally, and as used herein, private data may be of varying types, such as a person's private or secret data (e.g. user personal information), confidential data (perhaps associated with an enterprise), or other sensitive data based, for example, on user preference.

In use, the authorized user configures a protection profile (e.g., a password protection profile) for the device via a user interface. The profile includes at least one security event, and at least one protection action. The event may be quite varied, such as device turn-off, device movement outside a configured range, device access outside a configured usage pattern (e.g., in the middle of the night), device movement within a time criteria, device movement with an associated speed or acceleration, device access with a non-registered biometric, combinations of such events, and the like. The protection action may be quite varied, such as up disabling, removing, erasing, or encrypting (with a previously-established master password) certain device-resident data, such as one or more device-resident passwords. In this manner, the private data on the device remains secure.

Preferably, the application provides a mechanism for updating or overriding (or cancelling) the protection profile, or otherwise ensuring that it is not triggered inadvertently. In addition, the application may include a mechanism to enable the user to recover from its use quickly, e.g., by re-entering passwords.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
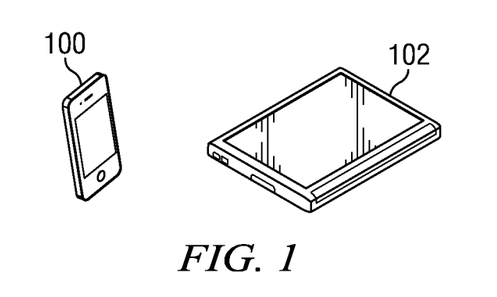
FIG. 1 is an exemplary mobile device or tablet device in which the data protection method of the disclosure is implemented.

FIG. 1 illustrates a known mobile device, such as a smartphone 100 or tablet 102, in which the private data protection mechanism of this disclosure may be implemented. Representative mobile devices include, for example, the Apple iPhone® or iPad®, an Android™-based mobile device, or the like. The disclosed subject matter is not limited for use with any particular device.

Figure 2:
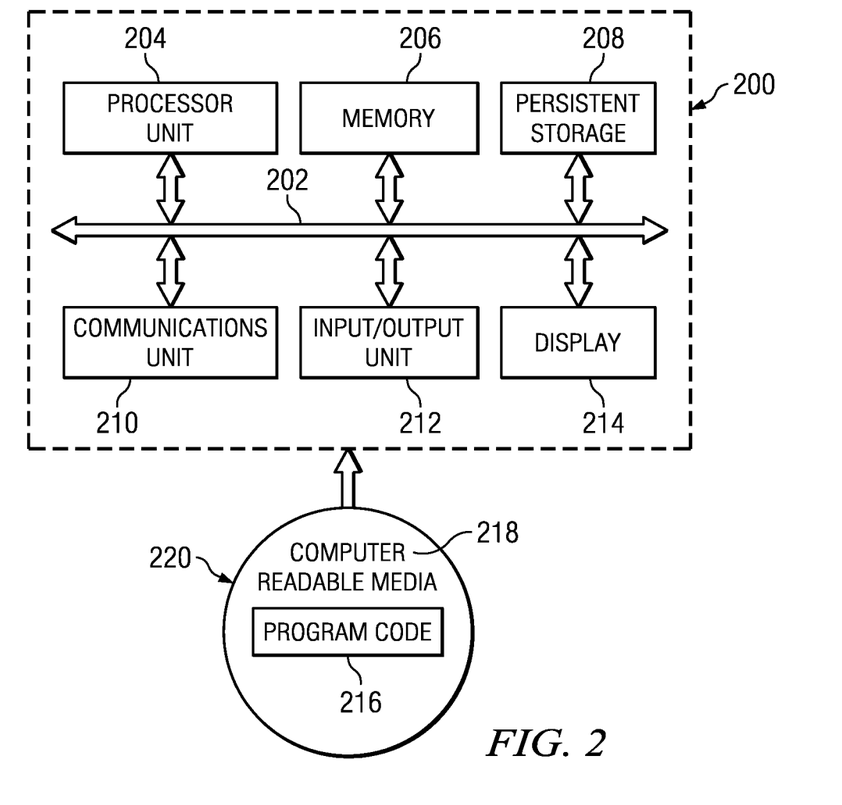
FIG. 2 is an exemplary block diagram of a data processing system in which exemplary aspects of the illustrative embodiments may be implemented.

The subject matter herein is implemented in a computing machine or data processing system. With reference now to FIG. 2, a block diagram of an exemplary data processing system is shown in which aspects of the illustrative embodiments may be implemented. Data processing system 200 is an example of a computer, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a wireless local area network (WLAN) or a wide area network (WAN), or the connection may be made to an external computer (for example, through the Internet using an Internet Service Provider).

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted. Also, the processes of the illustrative embodiments may be applied to a multiprocessor data processing system, other than the SMP system mentioned previously, without departing from the spirit and scope of the disclosed subject matter.

Figure 3:
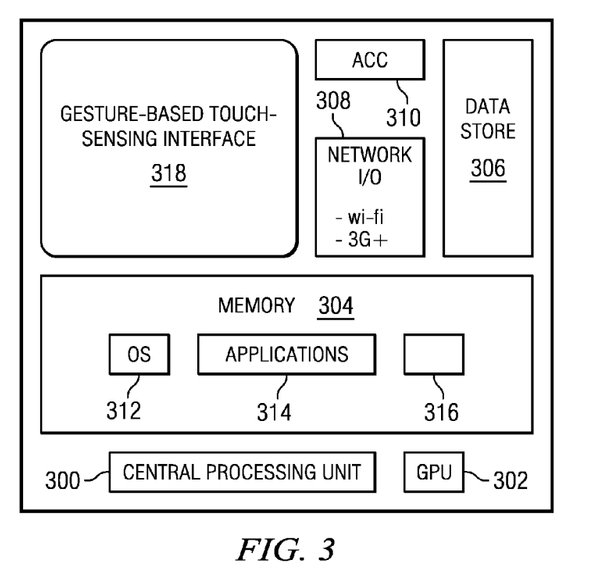
FIG. 3 illustrates representative hardware and software elements of a mobile device in which the subject technique may be implemented.

With the above as background, FIG. 3 illustrates the basic hardware and software components of a mobile device that implements a data processing system such as shown above in FIG. 2. In particular, the device typically comprises a CPU (central processing unit) 300, (such as any Intel- or AMD-based chip), GPU (graphics processing unit) 302, computer memory 304 (such as RAM), flash memory (or equivalent) data storage 306, network I/O 308, and a 3-axis accelerometer 310 (which measures acceleration and indicates the orientation of the device. The device may also include a gyro that measures rate of rotation around a particular axis. The data storage and memory support device software, such as an operating system (e.g., Apple iOS, Google® Android, or the like) 312, mobile applications 314, and generic support applications and utilities 316. One support application is a screen lock function by which the display interface (except for password entry) or the device itself (or some application or the like) is locked, e.g., after a configurable time of inactivity.

The mobile device also includes a touch-sensing device or interface 318 (e.g., a "touch screen") configured to receive input from a user's touch and to send this information to the processors in the device. The touch screen recognizes touches, as well as the position, motion and magnitude of touches on a touch sensitive surface, and the device software facilitates gesture-based control.

The device also may include other devices, interfaces and software including, without limitation, a camera, a GPS client, a biometric sensor/application, one or more audio speakers, and the like.

Generalizing, the mobile device is any wireless client device, e.g., a cellphone, pager, a personal digital assistant (PDA, e.g., with GPRS NIC), a mobile computer with a smartphone client, or the like, that sends and receives data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. A 3G—(or next generation) compliant device also includes a subscriber identity module (SIM), which is a smart card that carries subscriber-specific information, and necessary mobile equipment (e.g., radio and associated signal processing devices) to facilitate communications with the applicable radio access or other wireless network.

Data Protection using a Protection Profile

As described above, this disclosure describes a private data protection application that is executed on the mobile device and provides a display interface by which an authorized user can define and configure a "private data protection profile" for the device. The protection profile is sometimes referred to herein as a "theft" profile because it defines the one or more events (and their associated actions) that are to be enforced on the device when the device is stolen or otherwise compromised. As noted above, the private data may be of varying types, such as a person's private or secret data (e.g. user personal information), confidential data (perhaps associated with an enterprise), or other sensitive data (whether qualifying as secret or confidential) based, for example, on user preference. With respect to the techniques described herein, the particular nomenclature (e.g., private, secret, confidential or sensitive) should not be construed as limiting.

Typically, the private data is a password (or a set of passwords). When the scheme is used to protect passwords, the profile is sometimes referred to as a "password protection profile." As noted, the use of the scheme to protect passwords is merely exemplary and should not be taken to limit the disclosure.

In general, the profile defines at least one security event (criteria or condition) associated with the device, and at least one protection action that should occur to protect private data on the device upon the triggering of the event. Once defined in a profile, the application monitors for the occurrence of the security event. Upon the occurrence of the specified event, the protection action is enforced on the device to protect the private data.

For purposes of explanation only, the remaining portions of the disclosure describe passwords as the private data.

Figure 4:
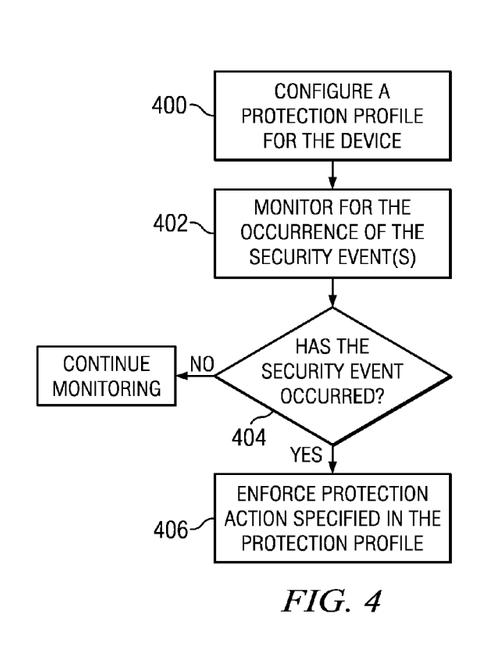
FIG. 4 depicts a representative process flow of a password protection mechanism according to this disclosure.

In operation, and with reference to the process flow in FIG. 4, the authorized user configures a password protection profile for the device via a user interface. This is step 400. The profile includes at least one security event, and at least one protection action. The event may be quite varied, such as device turn-off, device movement outside a configured range, device access outside a configured usage pattern (middle of the night), device movement within a time criteria, device movement with an associated speed or acceleration, device access with a non-registered biometric, and the like. The protection action may be quite varied, such as up disabling, removing, erasing, or encrypting (with a previously-established master password) the device-resident passwords. In this manner, the private data on the device remains secure. At step 402, the application monitors for the occurrence of the security event. At step 404, a test is performed to determine if the security event has occurred. If not, the routine cycles, waiting for the security event to be triggered. Upon a positive outcome to the test at step 404, which indicates the occurrence of the specified event, the routine continues at step 406. At this step, the protection action is enforced on the device to protect the private data. This completes the basic processing.

Figure 5:
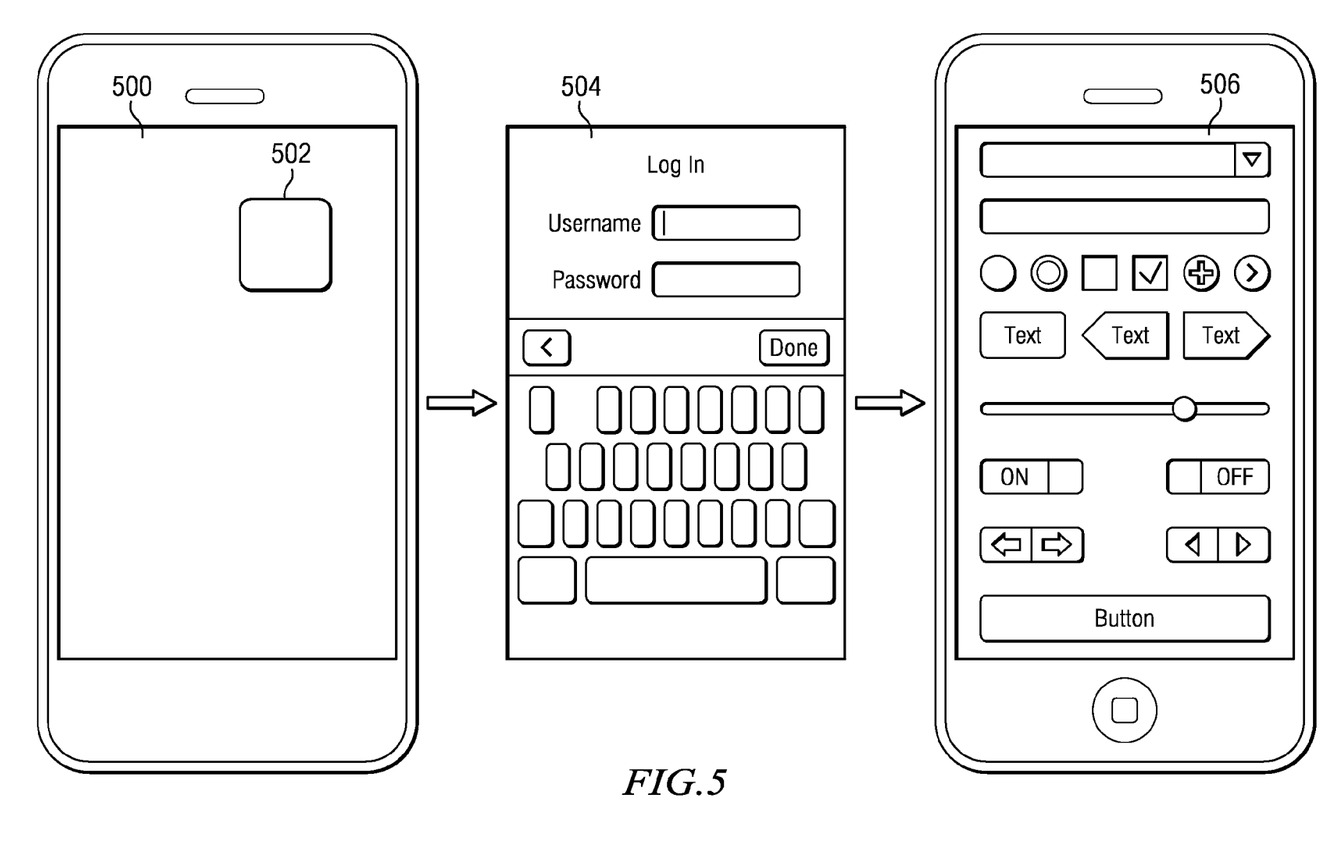
FIG. 5 illustrates a representative user interface for configuring a password protection profile according to one embodiment.

FIG. 5 illustrates a basic user operation for configuration of a private data protection profile according to this disclosure. The functionality is implemented via an application that is native to the device, or that may be downloaded and instantiated on the device in the usual manner. Thus, device 500 includes a display interface that includes application icon 502; selection of icon 502 starts the application. On first use, the user performs a log-in, using log-in display screen 504. In this alternative, the log-in may occur through an external registration process (e.g., if the protection scheme is implemented as part of service). Once registered or logged-in to use the application, the user is presented with a set of graphical user interface tools 506 by which he or she can configure a protection profile. FIG. 5 illustrates a generic set of interface tools 506 for this purpose, as the particular "configurator" tool may be of any type. The application may provide a set of "default" profiles that can be selected by the user to simplify the configuration or use of the application. Typically, however, the user will create a custom profile or profiles to suit the individual protection needs. Once the custom profile is defined and selected, the application preferably is executed by the device operating system as a background task so that it can continue to monitor for the security event that has been configured for the profile. Of course, the application may expose functionality to enable multiple profiles to be instantiated and executed concurrently, or for a particular profile to include multiple security events and their associated actions.

The profile configurator may also request that the user specify the location of private data to be protected. For browser applications, this is a well-known browser cache, and the application itself may identify this data store (and link to it, as necessary). For other applications (and their user names and passwords), the user may be prompted to identify and register the location of the password files, such that the information therein may be processed as configured in the profile upon the occurrence of the defined security event(s).

The nature and type of protection profile will vary, and this disclosure is not intended to be limited by any particular event/action but rather provides a general mechanism by which various event/action combinations can be defined and enforced on the device. The following provide representative scenarios.

A user John is attending a sports event at a stadium. At the same time, he wants to have quick and unrestricted access to his mobile device (e.g., to take pictures) but is aware of increased risk of his phone being stolen in the noisy, crowded environment. In this example, it is assumed that John already uses a master password to encrypt other passwords on the device. To protect his private data but allow ease of use in this scenario, John configures a profile having a security event that determines whether the mobile device moves outside a pre-defined area (e.g., a radius of 20 meters from his current location). The application then monitors for the security event, e.g., using the device GPS. If the security event is triggered, the application takes the action specified in the profile, e.g., deleting the master password. Thus, even if the thief is able to unlock the display or otherwise access the protected data, the thief lacks the master password necessary to access that data.

As another example, a user Susan visits a public swimming, where she swims laps. She needs to leave her phone unattended in a locker in a changing room and is worried about the phone being stolen. To protect her data, she enables a profile in which all private data will be wiped from the device if the device is moved within a configurable time period (e.g., 45 minutes, a time she intends to spend swimming). If the security event is triggered by a theft, the private data is deleted.

Figure 6:
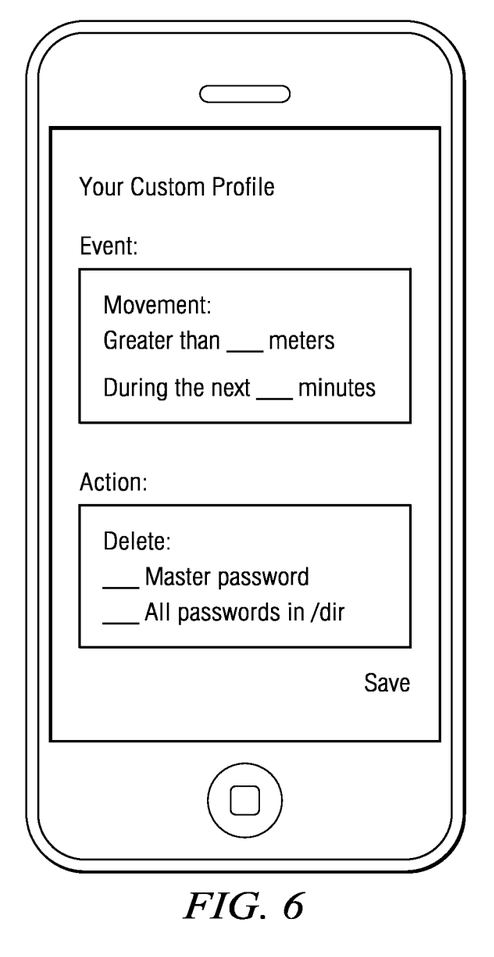
FIG. 6 illustrates a representative custom profile configurator for use to define a theft profile.

FIG. 6 illustrates a representative custom profile configurator for the above-described scenarios. As noted above, the particular nature of the profile configurator may vary.

Of course, the one or more security events may be combined to provide a more fine-tuned or nuanced degree of control. Thus, in the example scenarios described above and shown in FIG. 6, the two security events may both be required (movement of the device more than 20 meters away and occurring within 45 minutes of the setting).

The security event is not limited to movement away from the current location, or movement within a configurable time period. Indeed, many different types of conditions (or criteria) may be set, and these conditions may be completely defined by (and unique to) the user himself or herself. Thus, a particular security event might be use outside of a normal time/date usage pattern, movement of the device at a particular speed or acceleration (indicating that a thief has stolen the device and is running away), detection of a non-registered fingerprint (as determined by resident biometric scanning software), detecting a non-registered face (as determined by resident camera-based biometric scanning software) while accessing the device keyboard or other controls, powering off of the device (which a thief may do to attempt access), or many others.

Preferably, the protection application of this disclosure provides ancillary override and logging/reporting capabilities or functions. The override capability enables the user to define (as part of a custom profile, or more generally for all configured profiles) an "override" action that turns off the monitoring function. In this way, the authorized user has a mechanism by which he or she overrides the currently-active sensing for security events. This fail-safe is desired, because the authorized user may need to access and use the device where such access and use might otherwise trigger the protection mechanism. The override action itself may be customized, or a default action. A custom action might be rotation of the device 360 degrees (as sensed by the gyro), entry of a master code or special password, pressing a given key on the keypad for a given time period, entry of a voice command or gesture, some combination thereof, or the like. Any and all such override (or, more generally, cancellation) options may be implemented, preferably on a configurable basis.

The logging mechanism logs events and actions, which may be reported to external systems, preferably wirelessly. In addition, security events and actions may be communicated to external service providers which, in turn, may notify the authorized user of the theft or compromise by alternative means. The service provider may also provide a mechanism by which the device location can be tracked for law enforcement authorities to attempt to recover the stolen device.

The protection application as described may be linked to a password management system on the device. In this case, a particular profile action (that is to be taken upon occurrence of the security event) also may be automatically configured (either by the system, the protection application itself, or the application that is protected by the password).

As noted above, preferably the protection application also may include a mechanism for updating, enabling, cancelling, suspending, over-ridding a current security event (or criteria associated therewith), or disabling the password protection profiled. In addition, the application may provide a mechanism to facilitate recovery of passwords that have been affected by the action. Thus, the mechanism may facilitate recovery of passwords that have been previously encrypted, e.g., using biometric user data, by re-creating/saving the passwords. Of course, these features or functions are only implemented if the theft or compromise condition has been rectified or shown to be non-problematic.

The protection mechanism described herein provides numerous advantages. A primary advantage is to secure the user's private data. Moreover, the configurator tool enables the user to define and enforce a custom profile such that a certain user-configured security event triggers a user-configured action. A custom profile may be configured "on-the-fly" by the user given the current circumstances that he or she encounters or may encounter. The approach is much more flexible and secure that techniques in the prior art, which typically offer "all-or-nothing" degrees of protection in general and little or no protection for a stolen device. By allowing the user to define and enforce custom profiles in this manner, a much more fine-grained degree of control can be exercised by the user but in a manner that can be easily recovered from.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the anomaly detection function is implemented in software, which includes but is not limited to firmware, resident software, microcode, and the like. The data retrieved by the detection device can be configured into a data structure (e.g., an array, a linked list, etc.) and stored in a data store, such as computer memory. Furthermore, as noted above, the private data protection functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the protection application components are implemented in a special purpose computer, preferably in software executed by one or more processors. The associated profile(s) are stored in an associated data store, possibly a secure memory. The software also is maintained in one or more data stores or memories associated with the one or more processors, and the software may be implemented as one or more computer programs.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The invention claimed is:

1. A method of protecting a mobile computing device and private data stored therein, comprising:
   providing an interface adapted to receive user-specified configuration information from an authorized user of the mobile computing device;
   upon receipt from the authorized user of the user-specified configuration information via the interface, configuring a data protection profile for the authorized user that identifies at least one event, and at least one action to be taken with respect to the private data specified in the data protection profile upon occurrence of the at least one event;
   determining whether the at least one event identified in the data protection profile has occurred;
   when the at least one event identified in the data protection profile has occurred, enforcing the at least one action to inhibit unauthorized access on the mobile computing device to the private data specified in the data protection profile; and
   overriding the data protection profile and thereby ceasing determination of whether the at least one event identified in the data protection profile has occurred upon receipt of other data indicative of a user-configured action;
   wherein the configuring, determining, enforcing and overriding operations are carried out in software executing in a hardware element.

2. The method as described in claim 1 wherein the private data is a password associated with an application adapted to be executed on the mobile computing device.

3. The method as described in claim 2 wherein the at least one action disables the password.

4. The method as described in claim 3 wherein the password is disabled by one of: cleaning the password, removing the password, erasing the password, and encrypting the password.

5. The method as described in claim 1 wherein the at least one event is one of: device turn-off, device movement outside a configured range, device access outside a configured usage pattern, device movement within a time criteria, device movement with an associated speed or acceleration, and device access with a non-registered biometric.

6. The method as described in claim 1 further including logging data about the security event and the action.

7. The method as described in claim 1 wherein the data protection profile also includes at least a second event, and wherein the at least one action is taken upon concurrent occurrence of both the first event and the second event.

8. The method described in claim 1 wherein the interface is a configurator tool that receives the user-specified configuration information and is operative to generate the data protection profile as a custom profile that is uniquely associated with the user of the mobile computing device.

9. The method as described in claim 1 wherein the data protection profile also includes at least a second event, and wherein the at least one action is taken upon concurrent occurrence of both the first event and the second event.

* * * * *